3,344,115
OPTICAL BRIGHTENING OF A POLYESTER BY INCORPORATING 2,5-DIMETHOXY TEREPHTHALIC ACID THEREIN

Walter Rein, Obernburg am Main, Germany, assignor to Vereinigte Glanzstoff-Fabriken A.G., Wuppertal-Elberfeld, Germany
No Drawing. Filed Nov. 13, 1963, Ser. No. 323,207
Claims priority, application Germany, Nov. 20, 1962, V 23,304
10 Claims. (Cl. 260—47)

This invention relates to the optical brightening of a polyester, and more particularly, to polyesters of aromatic dicarboxylic acids and glycols which contain an optical brightener condensed into the polymer chain or structure.

Polyesters have a number of important commercial applications, especially those polyesters obtained by condensing an aromatic dicarboxylic acid with a glycol to form a high molecular weight, linear, fiber-forming polyester which can be used for the production of various textile materials such as filaments, films, yarns, felts, fabrics and the like. In many of these commercial applications, it is highly desirable to optically brighten the polyester product by means of a brightening or whitening agent which will impart a generally blue fluorescence to the product. Many optical brightening agents have been suggested for use with polyesters, but they are often unsatisfactory in terms of stability and durability of the brightening effect.

For example, it is well known to apply optical brightening agents to polyester textile materials or similar end products, the brightening agent being more or less substantive for the polyester when applied in a bath or by some other finishing treatment. Also, some brightening agents have been added prior to or during the polycondensation of the dicarboxylic acid and glycol monomers so that the brightener is uniformly dispersed in the resulting linear, fiber-forming polyester. In both of these methods, the initial brightening effect is usually quite good. However, the compounds employed as brightening agents in these methods are usually non-reactive and are not chemically bound to the polyester textile material. As a result, the brightening effect is not particularly permanent or durable. Thus, the brightener tends to bleed or wash out of the polyester during various wash treatments or laundering, and a satisfactory brightening can be achieved only by the reapplication of fresh brightening agents. Also, where the brightener is added prior to or during polycondensation of the monomeric components, or where they are added to the molten polyester during spinning operations, the high temperatures which prevail in these processing steps tend to decompose the brightening agent and adversely affect the quality of the final product. Thus, the known brightening agents either have poor fastness or else are extremely unstable so as to form decomposition products under the high temperatures required for polycondensation and/or spinning operations.

In order to improve the wash fastness of the desired brightening effect, various attempts have been made to apply reactive brightening agents onto the surface of the polyester textile material, the reactive brightener then being fixed chemically to the polyester fiber. In this case, the fixing reaction for binding the brightener to the polyester fiber requires heat, special pH conditions and/or the addition of catalysts. Such fixing reactions necessarily complicate the production of the polyester products, and furthermore tend to damage the polyesters or to change their dyeing characteristics since fixing ordinarily occurs preferentially at the free end groups of the polyester molecule chain.

It is quite difficult to discover satisfactory reactive brightening agents because the brightening properties of any particular fluorescent compound are often changed by the addition of the required reactive substituent. Thus, the desired blue fluorescence may be changed into an undesirable shade or color by the addition of a reactive substituent, and this change may be even more pronounced when the brightener is fixed to the polyester material. This same result is often observed even when non-reactive fluorescent compounds are merely applied to a polyester. All of these factors make it quite difficult to predict the behavior of any fluorescent compound when added to a particular textile material. The optical brightening of a polyester has therefore been a very difficult problem in this art.

One object of the present invention is to provide an optical brightening of polyesters whereby the brightening effect can be achieved during the polycondensation of the monomeric reactants so as to achieve a more permanent and stable brightening effect while still maintaining the high quality of the polyester itself.

Another object of the invention is to provide linear, fiber-forming polyesters containing a small amount of an optical brightening agent which has been incorporated in the polyester in such a manner as to give a brightening effect which is extremely resistant to washing and which is stable under high temperatures.

These and other objects and advantages of the invention will become more apparent upon consideration of the following detailed specification.

It has now been found, in accordance with the present invention, that a very stable and fast brightening effect can be achieved by condensing into the polyester structure or polymer chain of a linear, fiber-forming polyester a compound selected from the group consisting of 2,5-dimethoxy-terephthalic acid and its lower alkyl esters in an amount sufficient to optically brighten the condensed product. The 2,5-dimethoxy-terephthalic acid and its esters which serve as the optical brightener can be represented by the formula

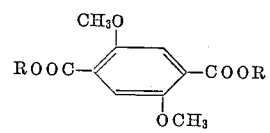

wherein R is hydrogen or lower alkyl such as methyl, ethyl, propyl or butyl, R preferably being hydrogen or methyl. It will be recognized that compounds of this formula with two functional acid or acid ester groups are employed for the purposes of this invention as an optical brightener and also as a monomeric reactant in the formation of linear polyesters by polycondensation of the usual polyester monomeric components, the optical brightener being added prior to or during the polycondensation reaction. Thus, the optical brightener of the invention is uniformly dispersed or homogeneously distributed in the polyester and is chemically bound in the molecule chain as a recurring unit of the formula

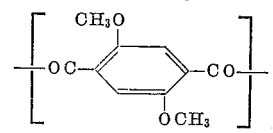

2,5-dimethoxy-terephthalic acid is especially suitable for the optical brightening of the polyesters of terephthalic acid or its lower alkanol esters with aliphatic or cycloaliphatic glycols. Among the polyesters to be brightened in accordance with the present invention, the best known and most widely used polymer is of course polyethylene terephthalate, i.e. the product obtained by polycondensing terephthalic acid or its dimethyl ester with ethylene glycol.

Modified polyethylene terephthalates are also useful in combination with the brightening agent of the invention, for example where still other dicarboxylic acids or glycols are polycondensed in small amounts of not more than about 10% and usually less than 5% by weight into the polyester structure in order to modify the physical properties or dyeability of the resulting polyester. For example, 1,4-trans-dimethylolcyclohexane can be condensed into the polyethylene terephthalate in an amount of about 0.1–10%, preferably about 1% by weight. Excellent polyester products have also been achieved by polycondensing terephthalic acid or its dimethyl ester exclusively with 1,4-trans-dimethylolcyclohexane in amounts up to not more than 70% by weight of the cycloaliphatic glycol. Similarly, other aliphatic glycols such as propylene glycol or butylene glycol can be used in place of ethylene glycol to form linear polyesters. Other types of polyesters include those obtained by using both terephthalic and isophthalic acids or their esters in the polycondensation reaction, for example in a weight ratio of approximately 90:10 of the terephthalic acid component to the isophthalic acid component.

In general, the preferred polyesters to be brightened in accordance with the present invention are those linear, fiber-forming polymers which were originally described by Whinfield et al. in U.S. 2,465,319, and well-known modifications thereof. The production and use of polyethylene terephthalate is described in detail by Moncrieff, "Artificial Fibres," 2nd ed., John Wiley & Sons, Inc. New York (1954), pp. 264–277. Other linear, fiber-forming polyesters are disclosed, for example, by Bjorksten in "Polyesters and their Applications," Reinhold Publishing Corp., New York (1956), pp. 199–224 and 356–369. Aromatic dicarboxylic acids or their lower alkanol esters are employed as the acid monomeric component in these polyesters, but those derived from terephthalic acid generally produce the best fibers. Modified terephthalic polyesters usually contain up to about 10% by weight, preferably not more than 5% by weight, of other aromatic dicarboxylic acids, such as isophthalic acid and naphthalene-1,4- or -1,6-dicarboxylic acid. While ethylene glycol is the preferred glycol monomeric component of the polyester, it will be apparent that good fibers can also be obtained when using propylene glycol, butylene glycol, 1,4-dimethylol-cyclohexane and other modifications which are well known in the prior art.

The optical brightening agent of the present invention is added to the polyester at any stage of the polycondensation process, in a small amount sufficient to achieve the desired brightening effect, usually at least about 0.01%. It is especially advantageous to use the brightening agent in an amount of about 0.1 to 2.5% by weight of the polyester. Larger amounts of the brightening agent can be condensed into the polyester, for example up to about 5% by weight, but without any additional advantge and with a tendency to lower the softening point of the polyester product.

For the purpose of condensing the optical brightener into the molecular chain of the polyester, all conventional methods for producing polyesters by polycondensation are suitable, for example, by directly condensing the dicarboxylic acid components with the glycol or by using the alkyl esters of the dicarboxylic acid components and proceeding through the steps of transesterification into the diglycol esters of the dicarboxylic acids and then polycondensing these diglycol esters. In these polycondensation methods, it is preferable to add the 2,5-dimethoxy-terephthalic acid or its lower alkyl ester as one of the monomeric components prior to any polycondensation. For example, when using the lower alkyl ester of 2,5-dimethoxy-terephthalic acid, preferably the dimethyl ester, this brightening agent is most advantageously added to the usual polyester components such as dimethyl terephthalate and ethylene glycol before the ester-interchange reaction. During transesterification, there is formed the corresponding 2,5-dimethoxy-terephthalic acid diglycol ester, and in the subsequent polycondensation reaction, the brightener becomes condensed into the molecule chain of the polyester while splitting off ethylene glycol. In all cases, the polycondensation is usually carried out under reduced pressure and for a period of time sufficient to produce a high molecular weight polymer capable of being spun and stretched into filaments or fibers. Since the 2,5-dimethoxy-terephthalic acid brightening agent is used in very small amounts, it is also possible to add this component at any later point of time in the production of the polyester under suitable polycondensation conditions. The exact method of condensing the brightener into the polyester is not important, and it will be recognized that the present invention is therefore applicable to a wide variety of polyesters and polycondensation methods.

The methoxy substituents of the 2,5-dimethoxyterephthalic acid brightening agent have been found to be completely stable or inert under the conditions normally required for transesterification and polycondensation reactions for the production of the polyester. The methoxy substituents are also stable under the conditions required in extruding and shaping polyester products such as films, filaments and the like. Relatively large amounts of the brightening agent can therefore be incorporated in the polyester without any tendency to form cross-linked products. This characteristic of the brightening agent is particularly advantageous in those cases where a linear, saturated, fiber-forming polyester is desired.

The excellent property which 2,5-dimethoxy-terephthalic acid or its ester possesses as an optical brightening agent is fully preserved even after the compound has been completely incorporated as a monomeric unit or chain member in the resulting polyester molecules. This fact is quite surprising because it is known that slight changes in the structure of a fluorescent compound tend to destroy its effectiveness as an optical brightener. Thus, instead of a blue fluorescence, the color may shift to a red or yellow shade or otherwise damage the optimum brightening properties. In the present instance, it was quite unexpected to discover that 2,5-dimethoxy-terephthalic acid or its esters could be condensed into a polymer chain without a complete loss of optical brightening.

The high molecular weight, linear, fiber-forming polyesters are not adversely affected by the brightening agent of the invention with respect to the physical and chemical properties required for textile materials. For example, the addition of 1% by weight of the brightening agent does not change the softening point of polyethylene terephthalate, and larger amounts of the brightening agent cause only a slight lowering of the softening point. In addition, the brightened polyesters can be easily shaped, extruded, spun and stretched over a wide range of temperatures without any damage to the polyester itself or to the brightening agent.

Since the optical brightening agent of the invention is chemically bound on both sides, i.e. through both of the carboxylic acid groups, to the remaining units in the molecular chain of the polyester, it is practically impossible to remove this brightening agent from the polyester by any washing or other extraction process. The brightened polyester therefore has a very high degree of stability to washing or laundering, and the brightening effect is therefore much more permanent than has been previously possible.

Moreover, the polyesters which have been brightened according to the present invention contain substantially the same number of free end groups as do the corresponding unbrightened polyesters, so that the products of this invention retain desirable dyeing and water absorption characteristics. These advantages cannot be achieved where the free end groups of the polyesters are blocked by the subsequent addition of the known reactive brighteners.

The following examples serve only to illustrate the invention, and it is not intended that the invention be limited to these examples.

Example 1

100 kg. of dimethyl terephthalate and 0.1 kg. dimethyl-2,5-dimethoxy terephthalate were transesterified with 90 kg. ethylene glycol in the presence of 0.01% by weight of zinc acetate and 0.02% by weight of manganese acetate in an autoclave equipped with an agitator at an increasing temperature from 160° C. to 200° C. The liberated methanol was removed from the reaction chamber by distillation. When this reaction was completed after two hours, the temperature was further raised until 32 liters of ethylene glycol were distilled off. Thereafter, 0.02% by weight of antimony trioxide and 0.5% by weight of titanium dioxide suspended in ethylene glycol were added and a vacuum was applied to the reaction vessel.

Within 30 minutes the pressure in the vessel was reduced to 1 mm. Hg. The polycondensation reaction then proceeded for about 90 minutes with increasing temperature terminating at 280° C. The resulting "copolyester" was extruded as a band, solidified in water and granulated. It had a softening point of 261° C. and showed intense blue fluorescence. The polymer could be shaped into filaments by the conventional melt-spinning process, the resulting filaments or fibers having an excellent optical brightening.

Example 2

In the same manner as described in Example 1, a mixed polyester was produced from 100 kg. of dimethyl terephthalate and 1.0 kg. of dimethyl-2,5-dimethoxy terephthalate, i.e. so that the polyester contained about 1% of the optical brightening agent. This polymer had a softening point of 260° C. and by melt-spinning could be easily shaped into filaments of high quality which were optically brightened to the same degree as the polymer prior to the melt-spinning.

Similar results can be achieved in the direct polycondensation of terephthalic acid with ethylene glycol by the addition of about 0.1–1% by weight of 2,5-dimethoxy-terephthalic acid rather than using the corresponding methyl esters of the acid components. When using about 1% by weight of 1,4-trans-dimethylol-cyclohexane as a glycol component of this polyester, a product can be obtained with a good brightening effect caused by condensing the optical brightener of the invention into the mixed polyester chain. These and other modifications of the polyester itself will be apparent to one skilled in the art, although the present invention is preferably directed to polyesters consisting essentially of at least 90% by weight of polyethylene terephthalate. Of course, such polyethylene terephthalates or similar polyesters may also contain other ingredients such as pigments, dyes, catalysts, fillers or the like as normally required in many polyester applications. Such modifications do not have any apparent effect upon the improved optical brightening of this invention.

Example 3

100 kg. of dimethyl terephthalate was transesterified in conventional manner with 90 kg. of ethylene glycol in the presence of 0.015% by weight of zinc acetate and 0.02% by weight of manganese acetate. After completed methanol liberation 0.5 kg. of 2,5-dimethoxy terephthalic acid is added to the reaction mixture, and then the excessive ethylene glycol is distilled over together with the water formed by esterification of the 2,5-dimethoxy terephthalic acid. After the addition of 0.02% of antimony trioxide and 0.5% of titanium dioxide suspended in glycol the following polycondensation was carried out as described in Example 1. Also the properties of the polyester obtained in such a manner correspond to those of the product which was obtained in Example 1.

Example 4

80 kg. of dimethyl terephthalate, 20 kg. of dimethyl isophthalate and 1 kg. of dimethyl-2,5-dimethoxy terephthalate were transesterified and condensed in the same manner as described in Example 1. After a condensation time of approximately 2 hours the obtained copolyester showed intense blue fluorescence and had a softening point of 210° C.

Example 5

As described in Example 1 100 kg. of dimethyl terephthalate, 1 kg. of dimethyl-2,5-dimethoxy terephthalate and 4.7 kg. (=3 mol percent based on the dimethyl terephthalate content) sodium salt of the 5-sulfo-isophthalic acid dimethylester were transesterified with 90 kg. of ethylene glycol and then condensed. The obtained optically brightened polyester had a softening point of 237° C.

Example 6

100 kg. of dimethyl terephthalate and 1 kg. of dimethyl-2,5-dimethoxy terephthalate were subjected to transesterification with 140 kg. of 1,4-butandiol in the presence of 0.1% by weight of zinc acetate under the same apparative conditions as described in Example 1. With increasing temperature until about 210° C. the chief quantity of the liberated methanol passed over at 150–160° C. After the distillative removal of the chief quantity of the excessive butandiol 0.02% by weight of antimony trioxide and 0.5% by weight of titanium dioxide suspended in butandiol were added to the transesterification product. Then the reaction vessel was evacuated and condensed 1¾ hours under a reduced pressure of less than 1 mm. Hg., whereby the interior temperature was gradually raised until a final value of 258° C. The polyester obtained in this way was optically brightened and had a softening point of 231° C.

Example 7

100 kg. of dimethyl terephthalate and 1 kg. of dimethyl-2,5-dimethoxy terephthalate were transesterified, according to Example 1, with a mixture consisting of 85 kg. of ethylene glycol and 5 kg. of 1,4-trans-dimethylol-cyclohexane and then condensed in vacuo. So an optically brightened polyester was obtained with a softening point of 235° C.

The invention is hereby claimed as follows:

1. An optically brightened linear fiber-forming polyester of the components consisting essentially of
   (A) a monomeric reactant selected from the group consisting of terephthalic acid, isophthalic acid, naphthalene-1,4-dicarboxylic acid, naphthalene-1,6-dicarboxylic acid and their lower alkyl esters,
   (B) a glycol, and
   (C) as an optical brightener, from about 0.01 up to 5% by weight, with reference to the polyester, of a monomeric reactant selected from the group consisting of 2,5-dimethoxy-terephthalic acid and its lower alkyl esters.

2. A fiber-forming polyester as claimed in claim 1 wherein the amount of said optical brightener in said polyester is about 0.1 to 2.5% by weight.

3. A fiber-forming polyester as claimed in claim 2 wherein said optical brightener is 2,5-dimethoxy-terephthalic acid.

4. A fiber-forming polyester as claimed in claim 2 wherein said optical brightener is dimethyl-2,5-dimethoxy-terephthalate.

5. The product of claim 2 in the form of a textile fiber.

6. An optically brightened polyethylene terephthalate containing as an optical brightener condensed into the polyester structure about 0.01 to 5% by weight of a compound selected from the group consisting of 2,5-dimethoxy-terephthalic acid and its lower alkyl esters.

7. A polyethylene terephthalate as claimed in claim 6 containing about 0.1 to 2.5% by weight of said optical brightener.

8. A polyethylene terephthalate as claimed in claim 7 wherein said optical brightener is 2,5-dimethoxy-terephthalic acid.

9. A polyethylene terephthalate as claimed in claim 7 wherein said optical brightener is dimethyl-2,5-dimethoxy-terephthalate.

10. The product of claim 9 in the form of a textile fiber.

References Cited
UNITED STATES PATENTS

| | | | |
|---|---|---|---|
| 2,894,934 | 7/1959 | Burkhard | 260—75 |
| 2,902,469 | 9/1959 | Burkhard | 260—75 |

SAMUEL H. BLECH, *Primary Examiner.*

WILLIAM H. SHORT, *Examiner.*

R. T. LYON, *Assistant Examiner.*